(12) United States Patent
Yin et al.

(10) Patent No.: US 7,613,322 B2
(45) Date of Patent: Nov. 3, 2009

(54) PERIODIC MOTION DETECTION WITH APPLICATIONS TO MULTI-GRABBING

(75) Inventors: Weihong Yin, Herndon, VA (US);
Andrew J. Chosak, Arlington, VA (US);
John Ian Wallace Clark, Leesburg, VA (US); Niels Haering, Reston, VA (US);
Alan J. Lipton, Herndon, VA (US);
Donald G. Madden, Falls Church, VA (US); Gary W. Myers, Ashburn, VA (US); Peter L. Venetianer, McLean, VA (US); Zhong Zhang, Herndon, VA (US)

(73) Assignee: Objectvideo, Inc., Reston, VA (US)

( * ) Notice: Subject to any disclaimer, the term of this patent is extended or adjusted under 35 U.S.C. 154(b) by 789 days.

(21) Appl. No.: 11/132,213

(22) Filed: May 19, 2005

(65) Prior Publication Data

US 2006/0262958 A1 Nov. 23, 2006

(51) Int. Cl.
*G06K 9/00* (2006.01)
(52) U.S. Cl. .................. 382/103; 382/107; 348/143
(58) Field of Classification Search .......... 382/103, 382/107; 348/143
See application file for complete search history.

(56) References Cited

U.S. PATENT DOCUMENTS 5,291,280 A * 3/1994 Faroudja et al. ........ 375/240.12
5,969,755 A   10/1999 Courtney
6,424,370 B1   7/2002 Courtney
6,766,056 B1 * 7/2004 Huang et al. ............. 382/190
2003/0053659 A1 * 3/2003 Pavlidis et al. ........... 382/103
2004/0080615 A1 * 4/2004 Klein et al. ............... 348/143
2005/0146605 A1 * 7/2005 Lipton et al. ............. 348/143

FOREIGN PATENT DOCUMENTS

JP         2000331254    * 11/2000

OTHER PUBLICATIONS

Ishiguro; "monitor camera"; JP2000-331254 description machine translation; Nov. 30, 2000.*

* cited by examiner

*Primary Examiner*—Bhavesh M Mehta
*Assistant Examiner*—Eueng-Nan Yeh
(74) *Attorney, Agent, or Firm*—Venable LLP; Michael A. Santori; Yao Wang (57) ABSTRACT

A method of video surveillance may include performing on input video at least one of the operations selected from the group consisting of motion detection and change detection, recording a motion pattern based on a result of said at least one of the operations, and analyzing the motion pattern to detect periodic motion in the video. A video surveillance apparatus may include a change detector, a motion detector, and/or a combination motion/change detector, a pattern analyzer, and a periodic motion detector.

12 Claims, 9 Drawing Sheets

8-neighborhood

Figure 9B 4-neighborhood

Figure 9A

PERIODIC MOTION DETECTION WITH APPLICATIONS TO MULTI-GRABBING

FIELD OF THE INVENTION

Embodiments of the invention generally relate to surveillance systems. Some specific embodiments of the invention relate to a video-based surveillance system that can be used, for example, in retail-based surveillance areas, to detect shoplifting.

BACKGROUND OF THE INVENTION

Some state-of-the-art intelligent video surveillance (IVS) system can perform content analysis on frames generated by surveillance cameras. Based on user-defined rules or policies, IVS systems can automatically detect potential threats by detecting, tracking and analyzing the targets in the scene. One significant constraint of the system is that the targets have to be isolated in the camera views. Existing IVS systems have great difficulty in tracking individual targets in a crowd situation, mainly due to target occlusions. For the same reason, the types of targets or the behaviors of the targets that a conventional IVS system can distinguish are also limited.

In many situations, security needs demand much greater capabilities from an IVS. One example is the detection of shoplifting. Theft from stores, including employee and vendor theft, costs retailers many billions of dollars per year. Independent retail studies have estimated that theft from retail stores costs the American public between 20 and 30 billion dollars per year. Depending on the type of retail store, retail inventory shrinkage ranges from 0.5%-6% of gross sales, with the average falling around 1.75%. Whole retail store chains have gone out of business due to their inability to control retail theft losses. Although most stores have video surveillance cameras installed, most of them just serve as forensic tape providers. Intelligent real-time theft detection capability is highly desired but is not available.

Certain suspicious activities by customers in retail stores could be indicators of potential theft. Examples of these include when a person takes and replaces a single item from a store shelf multiple times, and when a person takes more than the typical number of items from a shelf. Shoplifting rates can be greatly reduced if an IVS system can detect such suspicious activities and alert store management in real time.

Another exemplary scenario in which multi-grabbing may occur is in a gaming milieu. A casino, for example, may be concerned about monitoring when gaming participants reach onto gaming tables. Multi-grabbing in this scenario may reflect cheating and/or stealing. In particular, most casinos have rules applying to various gaming tables that require that no player reach beyond a certain threshold, into the domain of the dealer. This is to prevent players from reaching in and grabbing a stack of chips or cash. An algorithm to detect the motion of a player (that is, hand and arm) crossing this (generally invisible) threshold in a particular direction and then returning, while ignoring the opposite motion (e.g., by the dealer) would thus be useful to the casino owner.

SUMMARY OF THE INVENTION

Embodiments of the present invention are directed to algorithms and system modules for an IVS system to automatically detect "multi-grabbing" behavior of human targets by detecting and analyzing the periodic motion of target or part of the target.

An exemplary embodiment of the invention may be directed to a "multi-grabbing" detection algorithm comprising performing motion/change detection of an input surveillance video; recording a motion pattern; and detecting a "multi-grabbing" event by analyzing the motion pattern. A method for implementing such an embodiment may comprise performing on input video at least one of the operations selected from the group consisting of motion detection and change detection; recording a motion pattern based on a result of said at least one of the operations; and analyzing the motion pattern to detect periodic motion in the video.

A further embodiment of the invention may comprise an apparatus including a component selected from the group consisting of: a change detector, a motion detector, and a combination motion/change detector; wherein said component is to receive input video and to output motion data; a motion pattern analyzer to receive said motion data and to output motion pattern data; and a periodic motion detector to receive said motion pattern data.

The invention may also be embodied in the form(s) of hardware, software, firmware, and/or combinations thereof. Furthermore, such hardware may take the form of programmable and/or application-specific hardware, for example, one or more microprocessors, special-purpose processors, application-specific integrated circuits (ASICs), field-programmable gate arrays (FPGAs), etc.

The invention may also be embodied in the form of software embodied in a computer-readable medium and/or in a system containing such a computer-readable medium.

Definitions

The following definitions are applicable throughout this disclosure, including in the above.

A "video" refers to motion pictures represented in analog and/or digital form. Examples of video include: television, movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

A "target" refers to the computer's model of an object. The target is derived from the image processing, and there is a one to one correspondence between targets and objects.

A "block" refers to a group of pixels.

"Foreground" refers to the area in a frame having meaningful change over time. For example, a walking person may be meaningful to a user, and should thus be considered as foreground. In contrast, some types of moving areas are not meaningful and should be considered as background, such as water waves, tree leaves blowing, sun glittering, etc. Other areas, that do not contain motion, may be considered as background.

A "MOTION block" refers to a video block in which there are at least some predetermined number of foreground pixels present.

A "computer" refers to any apparatus that is capable of accepting a structured input, processing the structured input according to prescribed rules, and producing results of the processing as output. The computer can include, for example, any apparatus that accepts data, processes the data in accordance with one or more stored software programs, generates results, and typically includes input, output, storage, arithmetic, logic, and control units. Examples of a computer include: a computer; a general purpose computer; a supercomputer; a mainframe; a super mini-computer; a mini-computer; a workstation; a micro-computer; a server; an interactive television; a web appliance; a telecommunications device with internet access; a hybrid combination of a computer and an interactive television; a portable computer; a personal digital assistant (PDA); a portable telephone; and application-specific hardware to emulate a computer and/or software. A computer can be stationary or portable. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" may refer to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; software programs; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone, wireless, or other communication links. Examples of a network include: an internet, such as the Internet; an intranet; a local area network (LAN); a wide area network (WAN); and a combination of networks, such as an internet and an intranet.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

BRIEF DESCRIPTION OF THE DRAWINGS

Specific embodiments of the invention will now be described in further detail in conjunction with the attached drawings, in which.

DETAILED DESCRIPTION OF EMBODIMENTS OF THE INVENTION

Various embodiments of the invention will now be presented in detail.

Figure 1:
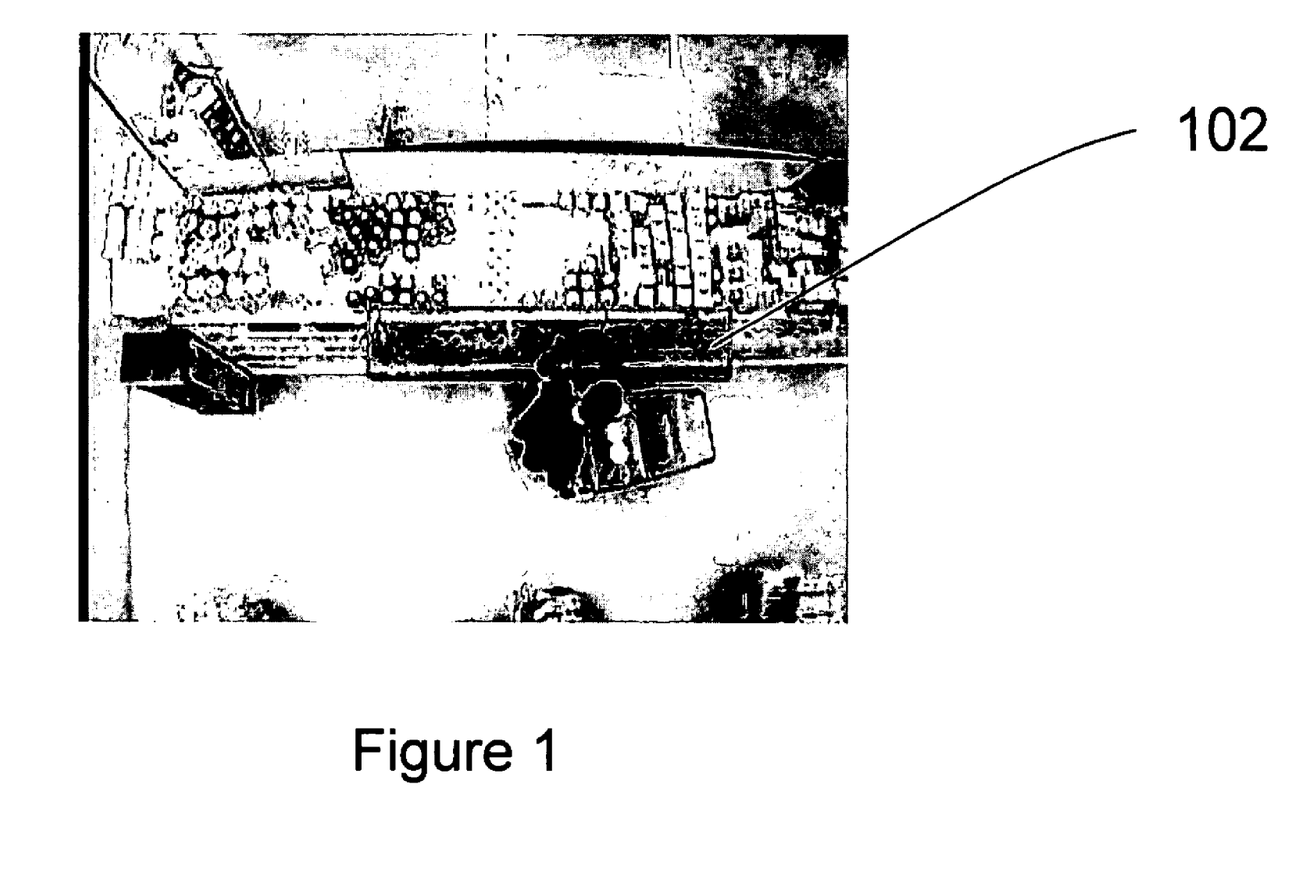
FIG. 1 depicts a typical scenario in which embodiments of the invention may be useful.

FIG. 1 depicts an exemplary application scenario for various embodiments of the invention, where a suspicious person takes a considerable number of large cans of infant formula from shelf in a wholesale store and part of his body moves back and forth from area 102, which is the area of interest (AOI), here, a store shelf. The motion pattern involved in such an activity may be considered to be periodic motion. Hence, to detect such an activity, it may be useful to have a way to detect periodic motion, and exemplary systems and algorithms to detect such periodic motion will be discussed below.

Figure 2:
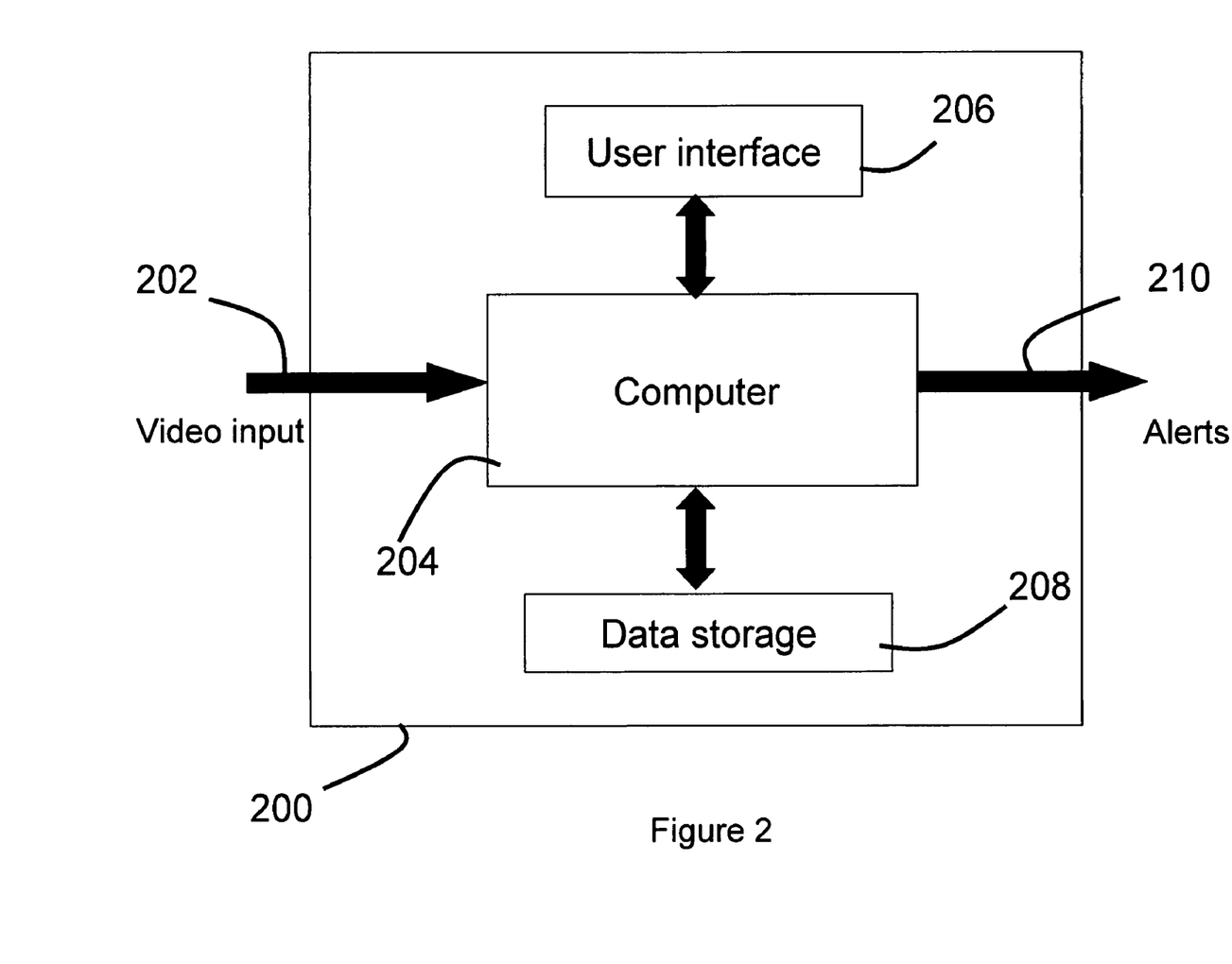
FIG. 2 depicts an overall video surveillance system according to some embodiments of the invention.

FIG. 2 depicts an overall video surveillance system according to some embodiments of the invention. The input 202 may be, for example, a normal CCTV video signal; it may, alternatively, be another type of video source. Block 204 may be a central processing unit that may be used to perform scene content analysis. Block 204 may include, for example, a microprocessor and/or special-purpose hardware and/or software and/or firmware. The user may set up the system through the user interface 206. Once any event is detected, alerts 210 may be sent to appropriate destinations (for example, but not limited to, staff, police, etc.); such alerts may be furnished with necessary information and/or instructions for further attention and/or investigations. The video data, scene context data, and other event related data may be stored in data storage 208 for later forensic analysis.

Figure 3:
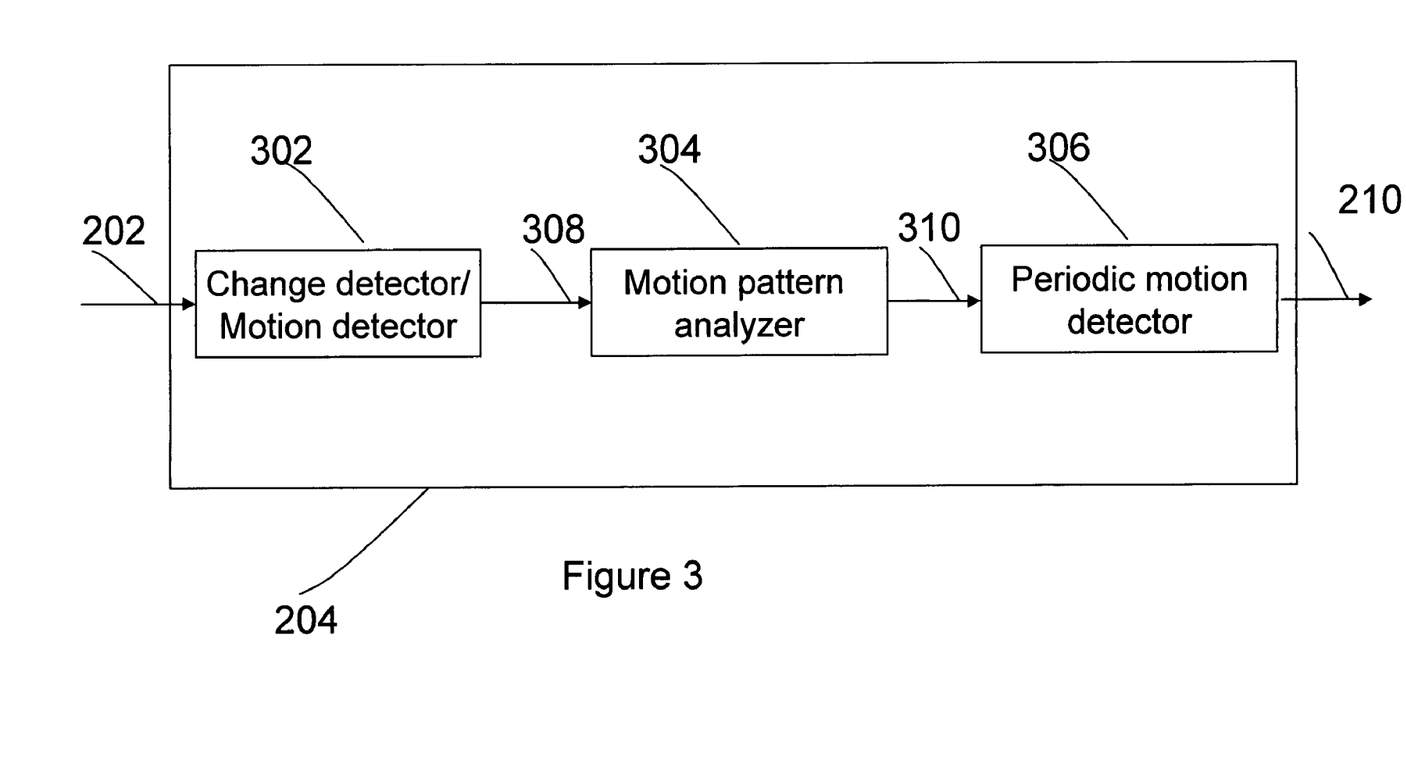
FIG. 3 depicts a conceptual block diagram of an exemplary periodic motion detection algorithm according to embodiments of the invention.
Figure 5A:
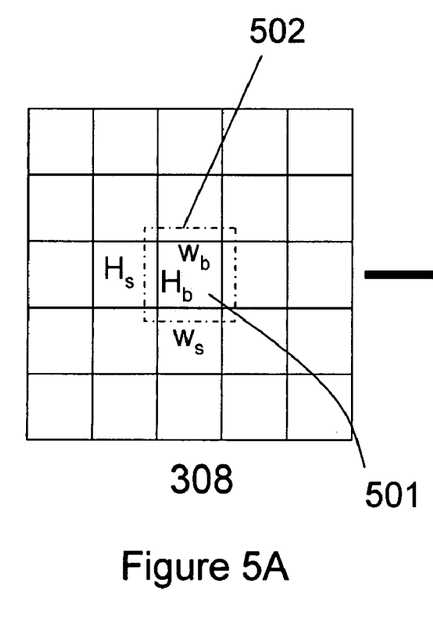
FIGS. 5A-5C depict an example of how to detect motion block in a foreground mask according to some embodiments of the invention.
Figure 7A:
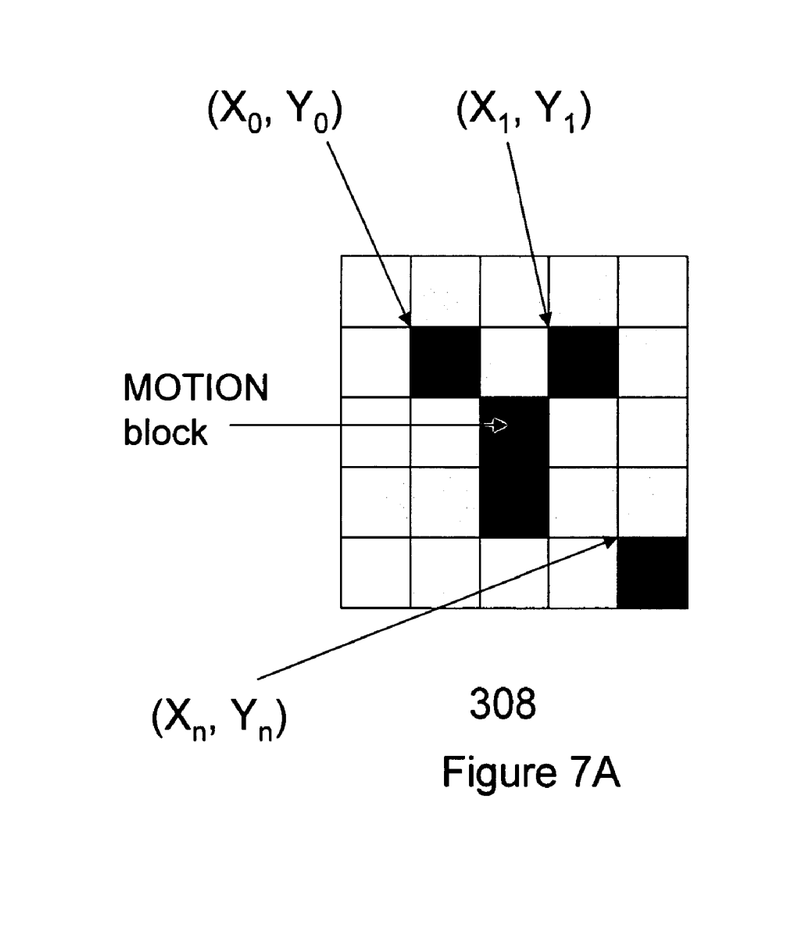
FIGS. 7A and 7B depict an exemplary MOTION block array and a corresponding foreground mask, as may be generated in some embodiments of the invention.

FIG. 3 depicts a conceptual block diagram of a periodic motion detection algorithm according to some embodiments of the invention. The input video frame may first be processed by module 302, which may comprise a change detector, a motion detector, or a combination of a change detector and a motion detector. The output 308 may include one or more foreground masks; exemplary foreground masks are shown in FIGS. 5A and 7A. A foreground mask may contain two values for the various pixels, foreground and non-foreground. Here, "foreground" represents meaningful changes over time. For example, a walking person may be foreground; some moving portion of a standing person's body may be foreground if he/she stands for a certain amount of time and only moves his/her arm. In contrast, "non-foreground" represents the non-change area over time, or some non-meaningful changes that a user should ignore, such as lighting changes or the shadow of a moving target.

Module 304, may go through the foreground masks in output 308 and may generate motion block masks. Then, based on a history of each motion block, module 304 may decide if the motion block information should be stored in an array 310, where the motion block information may include x and y coordinates of the motion block, as well as a current time stamp. Module 306, may be used to perform periodic motion event detection based on the motion block array, as well as on user-defined rules, which may include, but which are not limited to, such rules as area of interest, time window, and/or a minimum number of incidences of a periodic motion to indicate that a user should pay attention.

Figure 4:
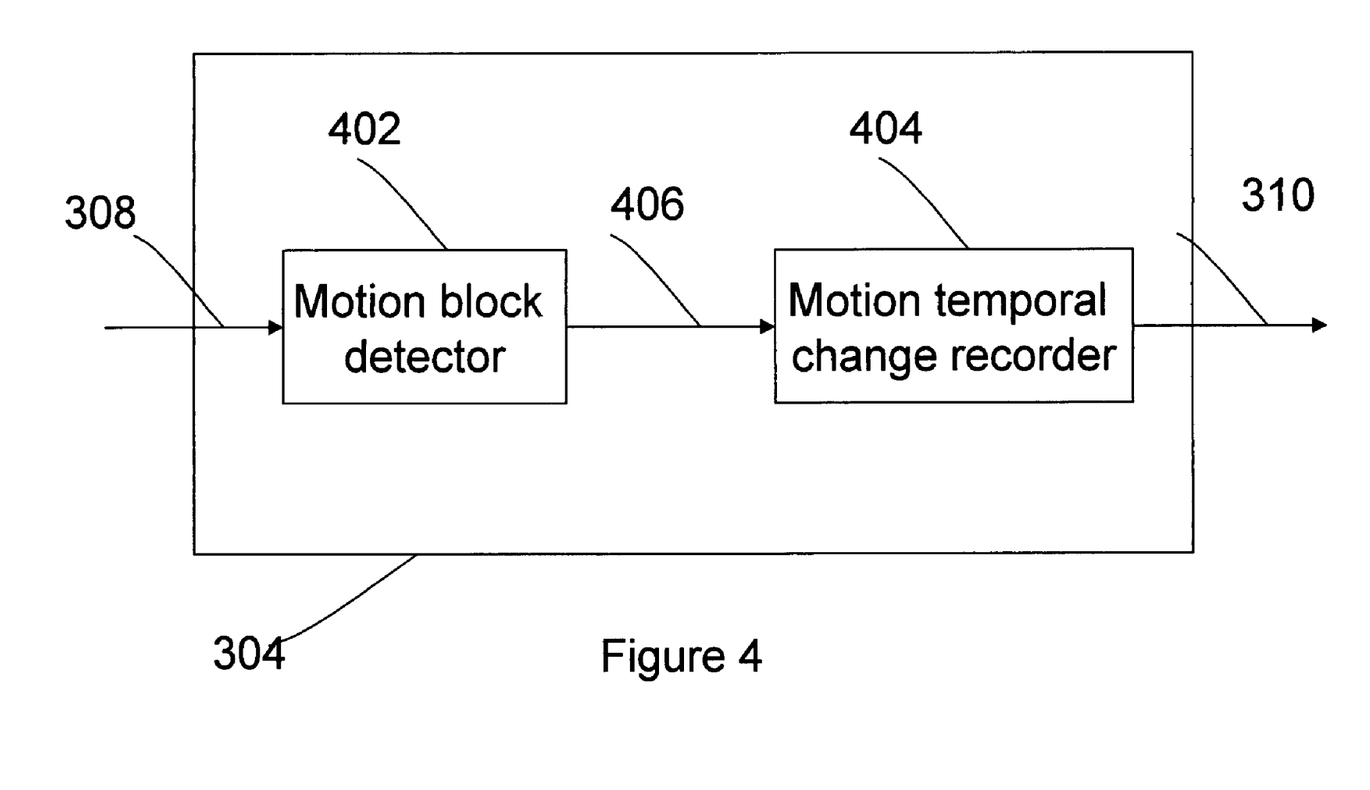
FIG. 4 depicts a conceptual block diagram of a motion pattern analyzer according to some embodiments of the invention.
Figure 5B:
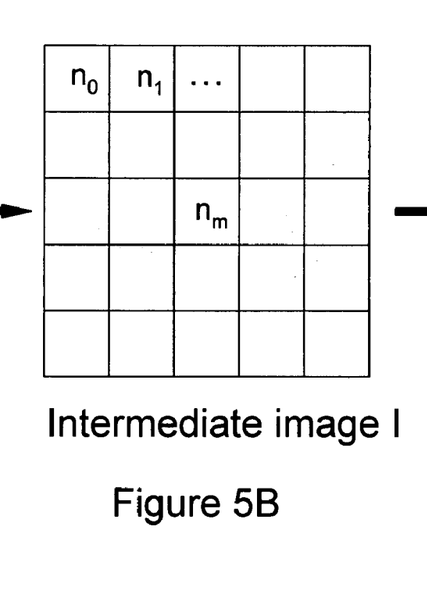
Figure 5C:
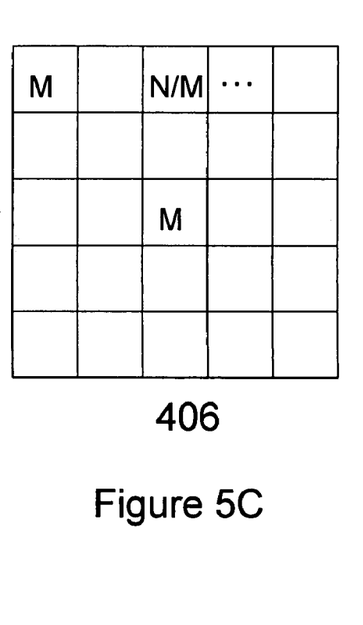

FIG. 4 depicts an exemplary block diagram of an embodiment of module 304, the motion pattern analyzer. The input may be 308, foreground mask(s), as discussed above. The module 402, motion block detector, may first divide a foreground mask image into blocks. As shown in FIG. 5A, the width of a block 501 may be denoted $W_b$, and the height of the block 501 may be denoted $H_b$. For each block, there may be a search window. The width of such a search window 502 may be denoted $W_s$, and its height may be denoted $H_s$. Motion block detector 402 may then count how many foreground pixels are in each such search window. Intermediate image I, shown in FIG. 5B, may be generated to record a number of foreground pixels for each block. The dimensions of I may be $W_1/W_b$ and $H_1/H_b$, where, $W_1$ and $H_1$ are the respective width and height of mask 308. Each element in I may comprise the number of foreground pixels in the search window of a corresponding block in 308. Finally, motion block detector 402 may perform thresholding on I, using a predetermined threshold value indicating a sufficient number of MOTION pixels in the block (which threshold may, for example, be a user-determined parameter). Mask 406 may be used to hold the thresholding results. An example of such a mask 406 is shown in FIG. 5C. If $N_m$ exceeds $N_T$, the corresponding element in mask 406 may be marked as MOTION (M), and if $N_m$ is less than or equal to $N_T$, the pixel may be marked as NON-MOTION (N/M), where $N_m$ is the number of foreground pixels in the search window of a particular block of I, and where $N_T$ is the threshold (which, again, may be inputted by a user), and the dimensions of mask 406 are the same as those of I.

The second module 404 in the exemplary embodiment of FIG. 4 is shown as a motion temporal change recorder. Exemplary operation of motion temporal change recorder 404 will now be described in conjunction with FIGS. 6, 7A, and 7B. Motion temporal change recorder 404 may read in a motion block mask 406, where each element in mask 406 represents if there are enough foreground pixels in the corresponding block in 308 (shown in FIG. 7A), as may be determined by means of the aforementioned thresholding. Then, for each element of mask 406, if it is a MOTION element, motion temporal change recorder 404 may look at its history. If this MOTION element has been a MOTION element for some predetermined time $d_0$, the information of this MOTION element may be stored in an array 310 (as shown in FIG. 7B), which includes the coordinates (x, y) of the first pixel in the block and a time stamp corresponding to a current video frame. $d_0$ may be decided by experimentation. For example, based on one exemplary example of experimentation, to which the invention is not necessarily limited, when a person grabs an item from a shelf, he/she needs to keep his/her arm out for about 0.8 seconds. In this case, $d_0$ should be set as 0.8 s. In general, this parameter may be set by users based on different applications.

Figure 6:
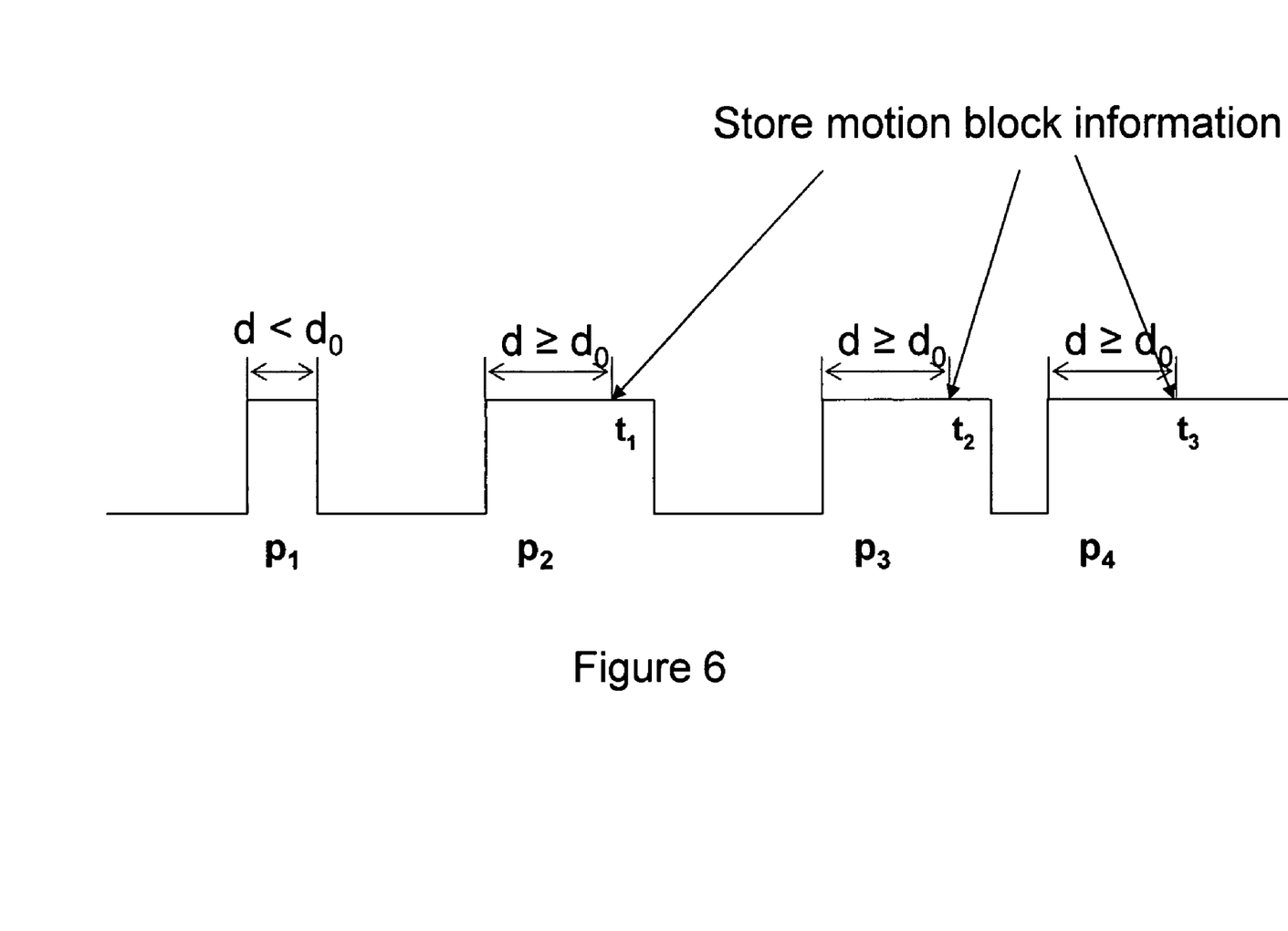
FIG. 6 depicts an example of an exemplary motion pattern of a MOTION element in the time domain, as may be present in some embodiments of the invention.
Figure 7B:
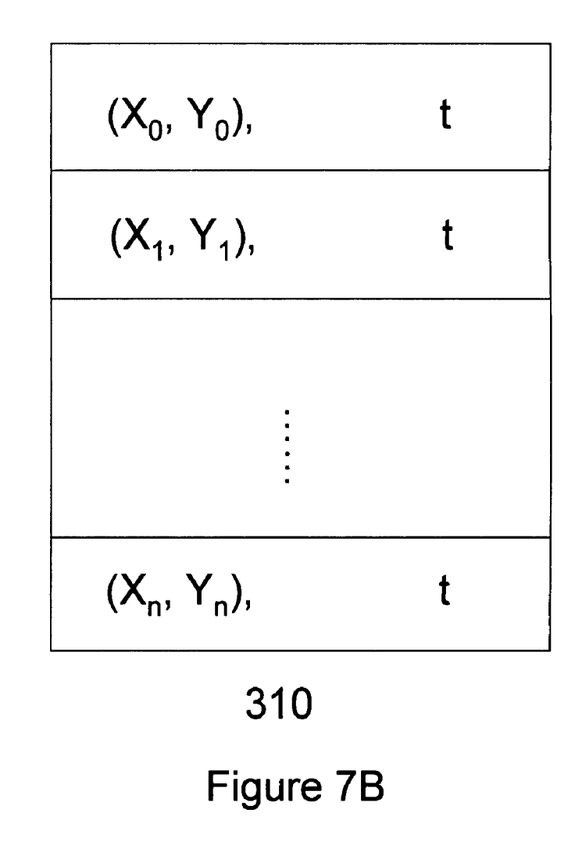

FIG. 6 shows an example of a motion pattern of a MOTION element in the time domain. Each peak P1-P4, in Figure 6 corresponds to a time period d in which an element of the mask is a MOTION element. For the first peak $P_1$, since its peak duration d is less than $d_0$, it may not be recorded For the other peaks $P_2$-$P_4$, the duration of each peak d is greater than or equal to $d_0$, and the block coordinates and the time stamps $t_2$-$t_4$, which correspond to the respective points of the peaks at which duration $d=d_0$ will be recorded in the array 310. FIG. 7B shows the details of an exemplary version of array 310.

For the frame at time stamp t, n motion blocks are stored; all of them have been MOTION blocks for as long as duration $d_0$. For the next frame at time stamp t+1, even some of the n motion blocks are still MOTION blocks, they may not be stored. As far as when a block goes back to NON_MOTION, then back to MOTION, the algorithm may restart the count of its duration as MOTION.

Figure 8:
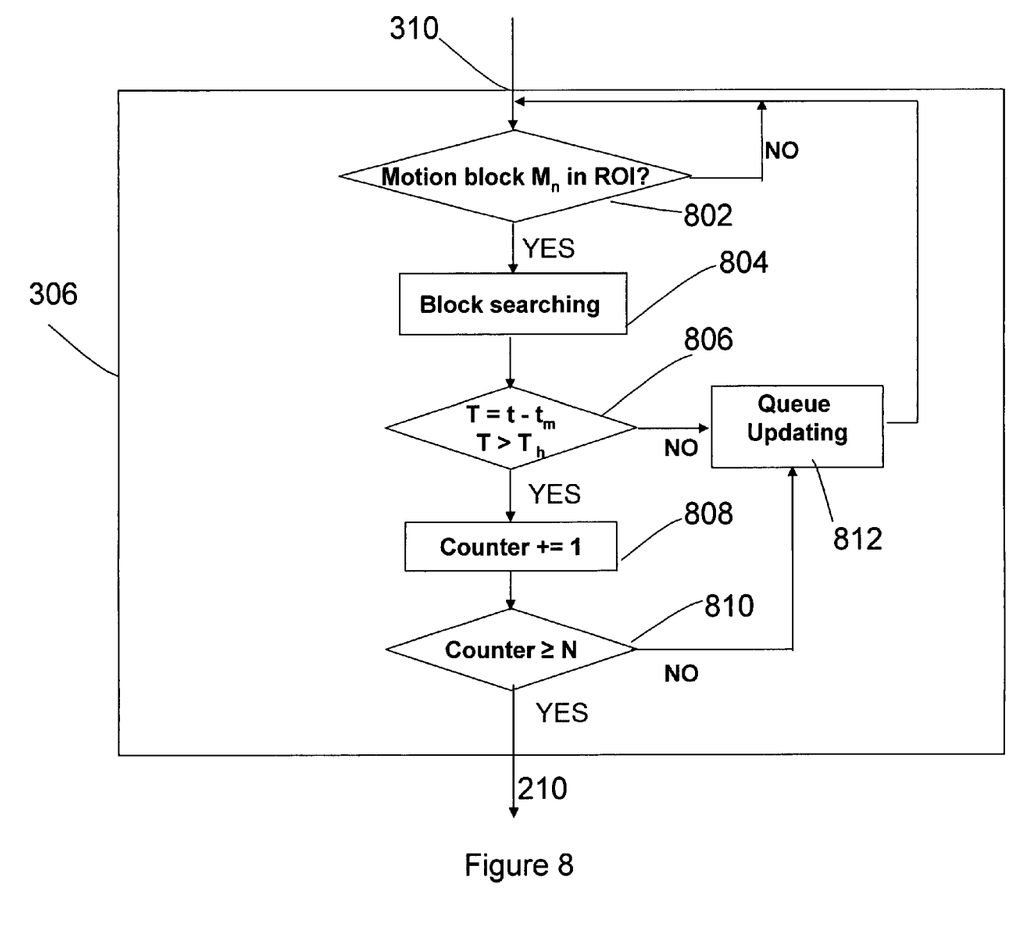
FIG. 8 depicts a conceptual block diagram of a periodic motion detector according to some embodiments of the invention.
Figure 9A:
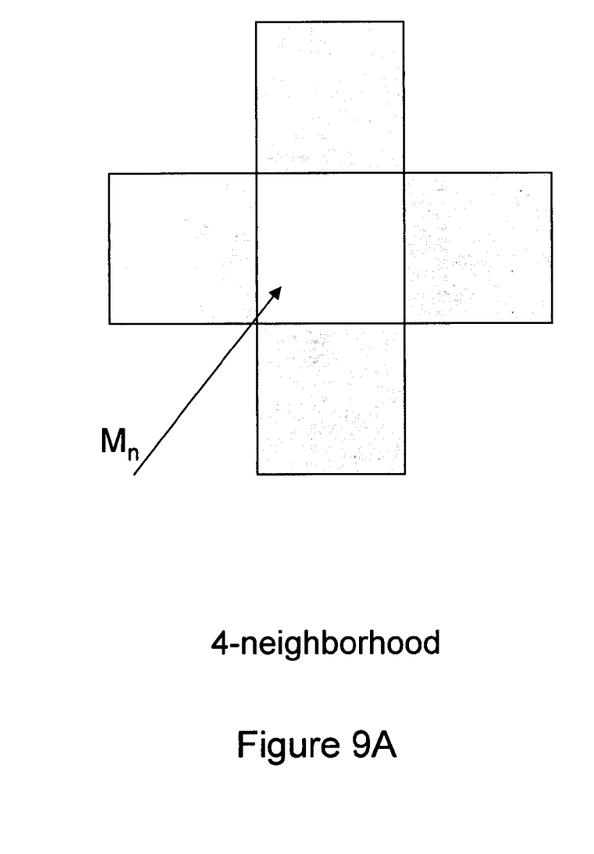
FIGS. 9A and 9B depict different neighborhood representations of a MOTION block.
Figure 9B:
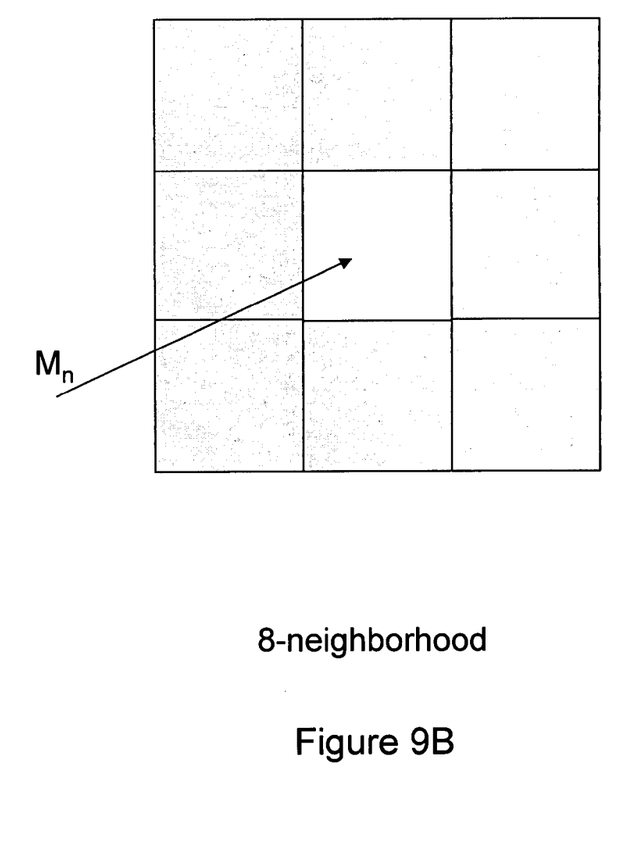

FIG. 8 depicts an exemplary embodiment of a process that may be implemented in module 306, a periodic motion detector, according to various embodiments of the invention. Periodic motion detector 306 may receive as input array 310. For each element in array 310, block 802 may check if the coordinates $(X_n, Y_n)$ denote a point in the area of interest (AOI), which may be defined by the user. If answer is NO, block 802 may look at the next element in the array. Otherwise, this valid motion block information may be stored in an internal queue in block 804. Then, for the same motion block $M_n$, whose time stamp is t, block 806 may check the internal queue to see if there is a motion block $M_m$, whose time stamp is $t_m$, with the same coordinates or in a given neighborhood of the block $M_n$, where a 4-neighborhood or a 8-neighborhood searching approach may be applied and the user may select which one is to be used. FIGS. 9A and 9B depict the meanings of 4-neighborhood and 8-neighborhood, according to exemplary embodiments of the invention. If there is such a motion block, and if the difference between their time stamps, $T=t-t_m$, is larger than a user-defined threshold $T_h$, i.e., if $T>T_h$, which means that there is a certain period of NON_MOTION between two MOTION peaks for a MOTION block, the process may proceed to block 808. Block 808 may then consider this motion block to have meaningful periodic motion, and it may increment (by one) a corresponding periodic motion counter for the block. Otherwise, if the answer is NO, the process may proceed to block 812. Block 812 may first make sure that all the elements in array 310 have been checked, and it may then perform internal queue maintenance. In particular, block 812 may make sure that all the motion blocks in the queue have to be in a time window about the current time stamp t, and it may discard old motion blocks whose time stamps are smaller than $t-t_w$, where $t_w$ represents the time window. The time window, $t_w$, may be a user-defined parameter. Finally, block 810 may check if the periodic motion counter is already larger than a user-defined threshold N. If it is, an alert 210 may be generated, and the user may be notified. Otherwise, the process may still proceed to block 812.

The embodiments and examples discussed herein should be understood to be non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method of video surveillance comprising:

receiving input video comprising a plurality of input video frames;

performing on the plurality of input video frames at least one of motion detection or change detection to obtain at least one foreground mask having a plurality of foreground pixels and a time stamp;

generating at least one motion block within an area of interest of the input video based on the obtained at least one foreground mask;

analyzing the generated at least one motion block to detect periodic motion of an object within the area of interest; and generating at least one alert if periodic motion is detected, wherein said generating at least one motion block comprises:

dividing one of the at least one foreground mask having a plurality of foreground pixels and one time stamp to obtain at least one block having a search window;

determining a number of foreground pixels present in the search window of the obtained at least one block;

comparing the number of foreground pixels present in the search window of the obtained at least one block with a threshold value; and generating at least one motion block having the time stamp of the foreground mask from which said at least one block is obtained, if the threshold value has been surpassed, wherein said analyzing the generated at least one motion block further comprises:

determining a period of time for which the generated at least one motion block has had its number of foreground pixels exceed said threshold value;

comparing said period of time with a time threshold;

if the period of time is larger than said time threshold, storing the pixel coordinates and time stamp of the generated at least one motion block in a motion block array for further analysis;

obtaining the pixel coordinates and time stamp of one motion block within the area of interest from the motion block array;

comparing the obtained time stamp to the time stamp(s) of at least one other motion block in the motion block array to determine if the differences between the obtained time stamp and the time stamp(s) of at least one other motion block are larger than a difference threshold;

defining a periodic motion counter for each set of pixel coordinates; and incrementing the periodic motion counter for the obtained pixel coordinates corresponding to the same motion block as that of the obtained time stamp if the differences between the obtained time stamp and the time stamp(s) of at least one other motion block are larger than the difference threshold.

2. The method according to claim 1, wherein said analyzing the generated at least one motion block further comprises:

comparing each periodic motion counter with a motion counter threshold to determine if the periodic motion counter exceeds the motion counter threshold, wherein periodic motion is detected if the periodic motion counter exceeds the motion counter threshold.

3. A computer-readable medium containing instructions that, when executed on a computer system, cause the computer system to implement the method according to claim 1, wherein the computer-readable medium is a hardware medium.

4. A video-based surveillance system comprising:
a computer system; and
the computer-readable medium according to claim 3, said computer-readable medium coupled to said computer system to enable said computer system to read and execute said instructions.

5. The video surveillance system according to claim 4, further comprising: at least one video source coupled to said computer system to provide said video data.

6. Application-specific hardware designed to implement the method according to claim 1.

7. The application-specific hardware according to claim 6, wherein said application-specific hardware includes at least one component selected from the group consisting of: an application-specific integrated circuit, a field-programmable gate array, and a special-purpose processor.

8. A method of multi-grabbing detection comprising the method of video surveillance according to claim 1, and further comprising:
detecting said periodic motion as multi-grabbing.

9. Video surveillance apparatus comprising:
a component selected from the group consisting of: a change detector, a motion detector, and a combination motion/change detector; wherein said component is to:
receive input video comprising a plurality of input video frames, each having a time stamp;
process the plurality of input video frames; and
output motion data comprising at least one foreground mask having a plurality of foreground pixels and one time stamp;
a motion pattern analyzer to:
receive said motion data comprising at least one foreground mask having a plurality of foreground pixels and one time stamp;
generate at least one motion block based on the received motion data; and
output motion pattern data comprising a motion block array; and a periodic motion detector to:
receive the motion pattern data comprising a motion block array;
detect periodic motion of an object within an area of interest based on the motion pattern data comprising a motion block array; and
generate at least one alert if periodic motion is detected,
wherein the motion block array comprises an array of pixel coordinates and corresponding time stamps of the at least one motion block generated by the motion pattern analyzer,
wherein said periodic motion detector is arranged to compare differences between pairs of said time stamps from the motion block array to a time threshold and to maintain and update a counter corresponding to each set of pixel coordinates based on said comparisons.

10. The video surveillance apparatus according to claim 9, wherein said motion pattern analyzer comprises:
a motion block detector to receive the motion data comprising at least one foreground mask having a plurality of foreground pixels and one time stamp and to detect one or more motion blocks based on the motion data; and
a motion temporal change recorder to check the persistence of each motion block.

11. The video surveillance apparatus according to claim 10, wherein said motion temporal change detector compares a duration of time during which a given motion block has been considered to be a motion block with a time threshold to determine if the motion block has been sufficiently persistent.

12. A multi-grabbing detection apparatus comprising the video surveillance apparatus according to claim 9, wherein said periodic motion is detected as multi-grabbing.

* * * * *